United States Patent Office 3,288,717
Patented Nov. 29, 1966

3,288,717
METHOD FOR PREPARATION OF URANIA SOLS
Leon E. Morse, Oak Ridge, Tenn., assignor to the United States of America as represented by the United States Atomic Energy Commission
No Drawing. Filed Oct. 12, 1965, Ser. No. 495,355
2 Claims. (Cl. 252—301.1)

The present invention relates generally to methods for the preparation of oxide nuclear fuel materials and more particularly to a method for preparing stable sols of uranium which are suitable for incorporation into nuclear fuel materials. The invention described herein was made in the course of, or under, a contract with the U.S. Atomic Energy Commission.

Uranium dioxide has been widely demonstrated as a useful fuel material for various types of nuclear reactors. The $UO_2$ may be incorporated into pellet form and encased in a protective metallic sheathing or it may be rendered into compactible fragments and fabricated into tubular fuel elements via vibratory compaction. Of recent interest is the attempt to incorporate the $UO_2$ into solid microspheres for use as reactor fuels. In a copending application S.N. 333,232, filed December 24, 1963, now Patent No. 3,262,760 issued July 26, 1966, in the names of Leon E. Morse et al. for "Method of Preparing High-Density Compactible Uranium Dioxide Particles," a method was disclosed which prepared high density $UO_2$ particles by a modified sol-gel technique that were highly suited for vibratory compaction into tubular fuel elements. There, the $UO_2$ particles were prepared by precipitating hydrous urania from a tetravalent uranium solution and subsequently separated and dried to gel fragments prior to incorporation into tubular fuel elements by vibratory compaction. While this process produced hydrous urania which was highly suited for vibratory compaction into tubular fuel elements, attempts to prepare stable uranium sols by this technique were unsuccessful.

It is therefore a primary object of this invention to provide a method for preparing stable urania sols.

Another object is to provide a method for preparing urania sols which may be utilized singularly or in mixtures with other actinide sols in the fabrication of reactor fuels.

Now according to the present invention it has been found that, if hydrous urania is precipitated from an aqueous uranous nitrate solution at a pH of 6.0 to 7.3 under a non-oxidizing atmosphere, filtered and washed, the urania can be peptized to form a stable sol by heating the washed filter cake at a temperature between 60°–80° C. until it is liquefied. Applicant has found, unlike thoria and plutonia, that stable urania sols, quite unexpectedly, may be prepared without dispersing the precipitated hydrous urania in any additional liquid. While applicant does not wish to be bound by any rigid theory, it is thought that the nitrate concentration of the precipitate when precipitated at a final solution pH of between 6.0–7.3 is sufficient to resuspend the solid precipitate upon liquefaction of the heated filter cake. At pH values above 7.3, it was not possible to form stable sols. This is believed attributable to the fact that the residual nitrate concentration of the precipitate is not sufficient to peptize the urania as a stable sol upon liquefaction of the filter cake. As the precipitation pH goes down, the nitrate concentration of the precipitate increases; and it becomes more difficult to form stable sols. In this respect it is thought that the nitrate concentration exceeds the concentration range required for satisfactory peptization, and the excess nitrate acts a flocculating agent, thereby destroying the sol. Moreover, as the precipitation pH decreases, the precipitate becomes slimy, viscous, and difficult to filter. The pH will in any event be maintained within the range of 6–7.3 during the precipitation step and preferably between 6.8 to 7.1.

Stable urania sols having a typical nitrate-to-uranium mole ratio of about 0.042 have been prepared. With such low nitrate-to-uranium mole ratios, these sols are suitable for blending with other sols such as thoria, zirconia, etc., in the desired ratio for the preparation of uniform mixtures of these materials. Moreover, the urania sol may be blended with such sols in any desired proportions.

In carrying out the process, hydrous urania is precipitated from an aqueous solution containing tetravalent uranium by addition of an alkaline reagent. The tetravalent uranium aqueous solution may be supplied in the form of an organic salt such as uranous formate or by reduction of hexavalent uranium in solution. The latter is preferred inasmuch as the most common source of uranium is uranyl nitrate solutions obtained in solvent extraction reprocessing of spent reactor fuels. Reduction of the uranium (VI) to the tetravalent state may be effected by a hydrogen reduction employing in conjunction therewith a platinum catalyst, such as 0.001 molar chloroplatinic acid, and a nitrate-inhibiting agent such as from 0.25–0.3 molar urea. Where used, the solution, after reduction is completed, is preferably filtered under an inert atmosphere to remove the platinum catalyst prior to the precipitation operation. The concentration of the uranium in the uranyl nitrate solution is not critical, but about 0.5 molar tetravalent uranium is preferred. The nitrate concentration is adjusted to satisfy the stoichiometric requirement for formation of uranous nitrate, i.e., nitrate/uranium (VI) ratio of 4 to 1, with a slight excess being preferred to prevent precipitation during reduction.

The alkaline reagent may comprise any strong base. In this selection it is preferred that the base selected be easily removed and not introduce any intefering ions and for this ammonium hydroxide is preferred. As noted above, the quantity of base is critical to the successful practice of this invention and should be of sufficient quantity to provide a final solution pH of between 6 to 7.3, preferably between 6.8 to 7.1. It should be apparent to those skilled in the art that, in order to preclude oxidation of the tetravalent uranium to the hexavalent state, oxygen should be substantially excluded during this precipitation operation, as well as in all subsequent process steps. For this an inert gas, such as argon, may be conveniently employed.

After the hydrous urania is precipitated it is separated from the mother liquor. For this any convenient separation technique, such as by filtration, may be employed. Again, an inert atmosphere, such as argon, should be employed to preclude oxidation of the urania to the hexavalent state.

The filter cake is next washed with water to remove any ionic materials which would interfere with the peptization of the urania upon heating.

The temperature at which the washed hydrous urania solid (filter cake) is heated to peptize the solid is critical insofar as care must be used to insure that the formed sol is not destroyed by excessive heating. While it might be possible to form a stable urania sol at temperatures as high as 100° C., to date no stable sol has been prepared at such a high temperature; and it is believed that, due to the inherent instability of such sols at elevated temperatures, it would be most difficult from a process standpoint to achieve, requiring numerous small-increment heating steps to insure uniform heating throughout the sol. It should be apparent in carrying out such a heating operation, that the filter cake undergoes progressive liquefaction until all of the urania solid is dispersed as a sol. If the heating phase is not stopped at this point, the sol may be destroyed by continued heating with the filter cake passing through a "pasty" stage. Thus while at temperatures between 60°–80° C. and preferably between 60°–65° C., the point at which the heating phase is terminated may readily be determined, at higher temperatures, i.e., above 80° C. the end point to which the sol may be heated without destroying it becomes progressively more difficult to determine. At temperatures lower than about 60° C. the time required for peptization becomes excessively long, e.g., about two weeks being required for peptization at room temperature. The temperature at which the filter cake is heated to peptize the urania sol will in any event be maintained within the range of 60°–80° C. and preferably between 60°–65° C. In this respect it should be apparent that moderate application of heat to effect peptization, in conjunction with the aforementioned critical pH range, are the key features to the successful preparation of stable urania sols by this method. It should be apparent that the heating time required for resuspension is not critical, except that the time should be adequate to permit complete liquefaction of the filter cake. Heating periods of about 5 hours have been found to be suitable, requiring about an hour to bring the system up to temperature and an extra hour after liquefaction to insure completeness thereof. While the urania sol prepared in accordance with this process has been found to be quite stable, i.e., with essentially no solid settling out upon standing overnight, the sol may be centrifuged to remove a small quantity of larger particles ($>$1 micron).

The stable urania sols may subsequently be processed into reactor fuel materials. For example, the urania sol may be dried to gel fragments which may be used to make tubular elements. For this, drying temperatures below 100° C., preferably about 90° C., may be employed until the urania has passed through a pasty stage and discrete fragments have been formed. Then drying temperatures of about 125° C. may be used to complete the drying operation, producing gel fragments. These gel fragments may then be densified by firing at temperatures of about 1100° C. and used as starting materials for vibratory compaction into tubular elements.

Alternately, the urania sol may be processed singularly or as a mixture with other sols, into fuel microspheres. This may conveniently be carried out by passing the sol into a sphere-forming column concurrently with an organic drying agent such as 2-ethylhexanol. A complete description of such a column is found in S.N. 385,813, filed July 28, 1964, in the name of Sam D. Clinton et al. for "Process and Apparatus for Preparing Oxide Gel Microspheres from Sols." There, the sol droplets are dehydrated to gel spheres which settle out and may subsequently be air-dried and calcined at a temperature of about 1100° C. to produce urania microspheres and/or mixed oxides microspheres.

The following example is offered to demonstrate the invention in greater detail.

EXAMPLE

Several urania sols were prepared as follows: To 325 milliliters of 0.5 M uranyl–2.3 M nitrate solution was added 6 grams of urea and 36 mg. of platinum catalyst as $H_2PtCl_6$. The urea was added as a holding reductant to react with $HNO_2$ and $NO_2^-$ and the platinum acted as a catalyst in the hydrogen reduction of hexavalent uranium to the tetravalent state.

Hydrogen, at the rate of 100 cc./min., was bubbled through the respective solutions to reduce the U (VI) to U (IV) and required about 20 hours to effect essentially complete reduction ($>$99%). The hydrogen was replaced with argon and the solutions filtered under an inert atmosphere to remove the platinum catalyst.

Hydrous urania was precipitated under an argon atmosphere from the uranous nitrate solutions by slowly adding 3.0 M ammonium hydroxide solution with rapid stirring. The ammonium hydroxide was added at the rate of about 10 ml./min. until a pH of between 5.5–9.5 was reached as indicated by a glass electrode. It was necessary to discontinue the addition of the ammonium hydroxide occasionally in order to permit the mixture to equilibrate.

The hydrous urania precipitates were separated by filtration under an argon atmosphere and were washed with 4.0 liters of distilled water to remove the $NH_4NO_3$.

The hydrous urania oxide solids were peptized by heating the filter cakes in an argon atmosphere to a temperature of 60°–95° C. until they liquefied. Heating was continued for an additional hour after the filter cakes had liquefied. The urania solids formed a stable sol without any additional liquid being added. After cooling to room temperature, the respective urania sols were centrifuged in order to remove all particles greater than 1 micron. The results are shown in the table below.

Table

| Run | Final pH | $NO_3^-/\mu$ mole ratio | Forming temp. (° C.) | Forming time (hours) | Remarks |
| --- | --- | --- | --- | --- | --- |
| 1 | 5.5 | 0.015 | 95 | | After 2 hours an opaque black fluid suspension formed. Could not determine how much solids were in suspension. |
| 2 | 6.0 | 0.045 | 80–85 | | After 1.5 hours an opaque black fluid suspension formed. Could not determine if all solids were in suspension. |
| 3 | 8.0 | 0.029 | 80–85 | | No indication of sol formation at any time. |
| 4 | 8.9 | 0.0004 | 80–85 | | Do. |
| 5 | 5.95 | 0.078 | 60–65 | 1.0 | Viscous sol. |
| 6 | 6.1 | 0.093 | 60–65 | 2.5 | Very viscous sol. |
| 7 | 6.5 | 0.084 | 60–65 | 1.0 | Good sol. |
| 8 | 6.9 | 0.043 | 60–65 | 2.5 | Do. |
| 9 | 7.1 | 0.042 | 60–65 | 2.5 | Do. |
| 10 | 7.48 | 0.009 | 60–65 | 3.5 | Incomplete sol formation. |
| 11 | 9.1 | 0.0016 | 80–85 | 3.5 | No indication of sol formation at any time. |
| 12 | 9.5 | 0.0014 | 80–85 | 2.5 | Do. |

From the results shown in the above table, it may be seen that at a final solution pH of less than 6 the precipitate became very difficult to filter and at a final solution pH greater than 7.3 a stable urania sol could not be prepared.

As many apparently widely different embodiments of this invention may be made without departing from the spirit and scope thereof, it is to be understood that the invention is not limited to the specific embodiments thereof except as defined in the appended claims.

What is claimed is:

1. A method for preparing a stable urania sol comprising the steps of precipitating hydrous urania from the aqueous uranous nitrate solution by the addition of an alkaline reagent at a final solution pH of 6.0–7.3 under a non-oxidizing atmosphere, separating under a non-oxidizing atmosphere the resulting precipitate from the remaining mother liquor and thereafter heating said separated precipitate at a temperature between 60°–80° C. under a non-oxidizing atmosphere whereby the urania is peptized to form said stable urania sol.

2. The method of claim 1 wherein said alkaline reagent is ammonium hydroxide, said pH is from 6.8 to 7.1 and said heating step is carried out at a temperature in the range of 60° to 65° C.

No references cited.

BENJAMIN R. PADGETT, *Primary Examiner.*

S. J. LECHERT, JR., *Assistant Examiner.*